O. M. HATCHER AND J. C. CAMPBELL.
EXTENSION STEERING DEVICE.
APPLICATION FILED MAY 31, 1921.
1,417,320.
Patented May 23, 1922.
2 SHEETS—SHEET 2.
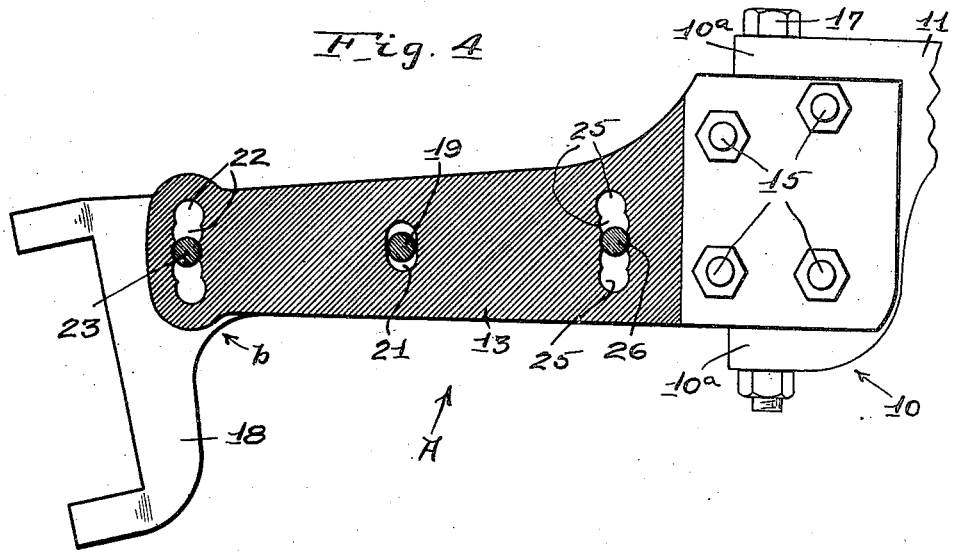
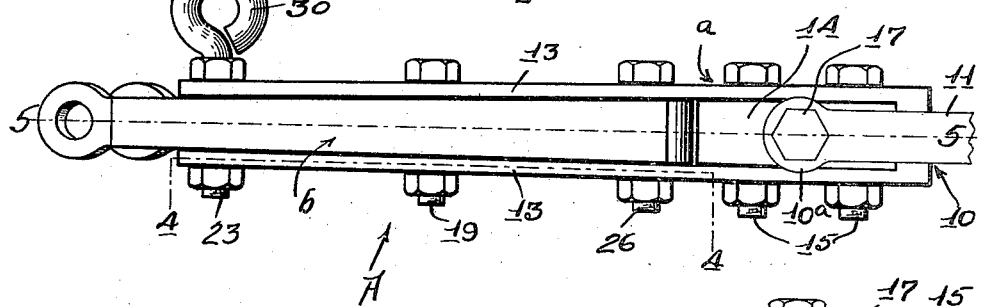
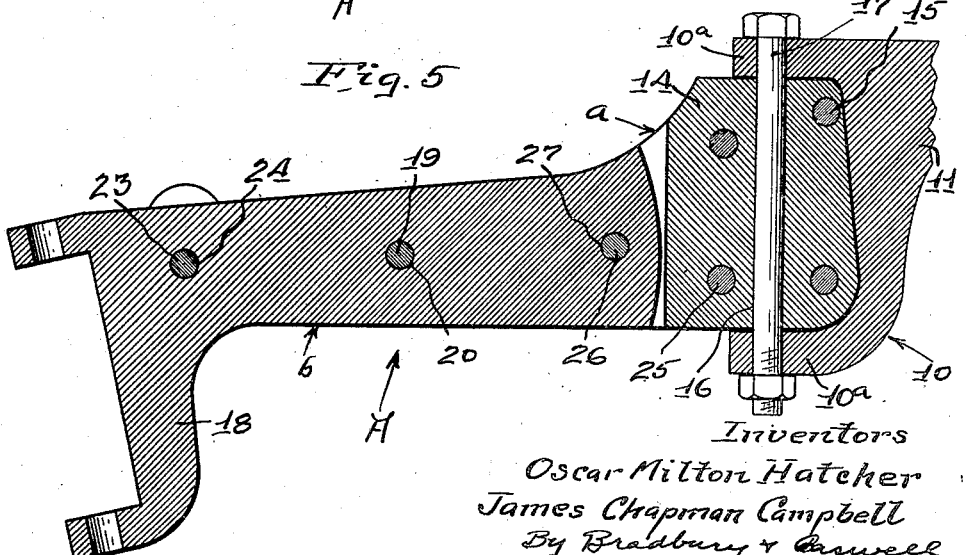
Inventors
Oscar Milton Hatcher
James Chapman Campbell
By Bradbury & Caswell
Attorneys

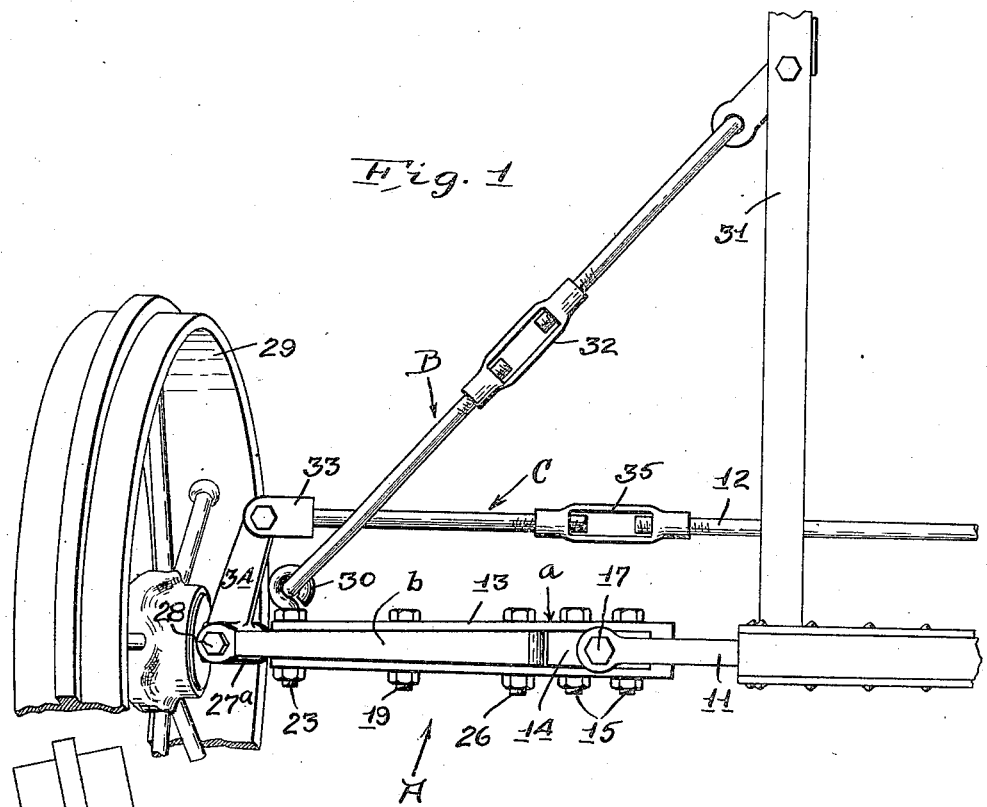
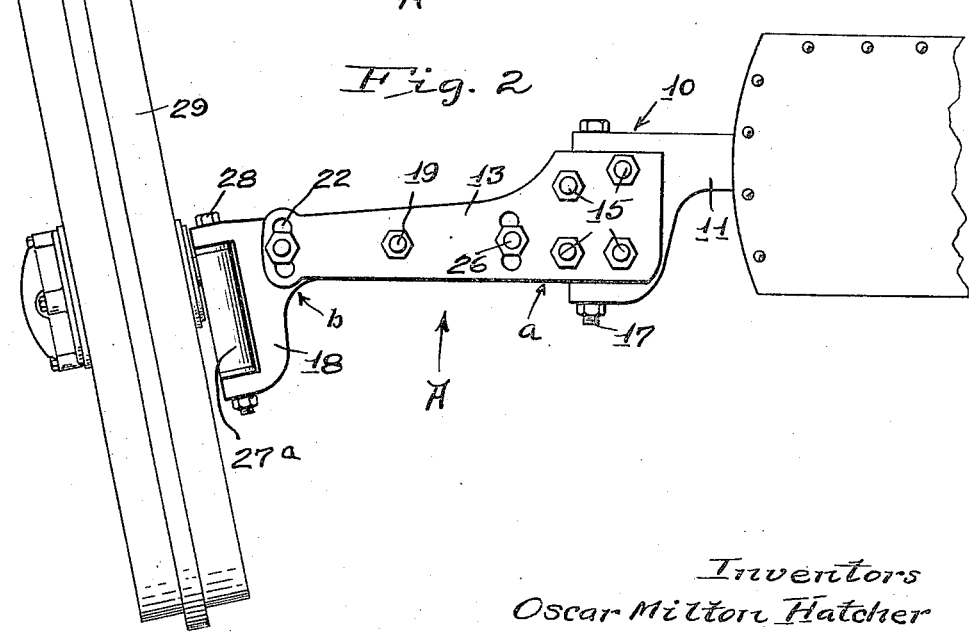

UNITED STATES PATENT OFFICE.

OSCAR MILTON HATCHER AND JAMES CHAPMAN CAMPBELL, OF MANKATO, MINNESOTA.

EXTENSION STEERING DEVICE.

1,417,320.  Specification of Letters Patent.  Patented May 23, 1922.

Application filed May 31, 1921. Serial No. 473,725.

*To all whom it may concern:*

Be it known that we, OSCAR MILTON HATCHER and JAMES CHAPMAN CAMPBELL, citizens of the United States, residing in the city of Mankato, county of Blue Earth, and State of Minnesota, have invented new and useful Improvements in Extension Steering Devices, of which the following is a specification.

Our invention relates to improvements in extension steering devices for tractors.

The traction wheels of tractors of many ordinary types follow in the paths of the steering wheels. In plowing, the inside steering wheel of a tractor is often run in the furrow against the landside thereof to automatically steer the tractor and thus allow the operator to attend more closely to the management of his plows. Under this practice, the traction wheel on one side of the tractor necessarily travels in the furrow in trailing the steering wheel therein. The footing of said traction wheel, under such conditions, is impaired and also depressed so that the tractor tips sidewise, thus causing continued undue strains upon the tractor mechanism.

One object of our invention is to provide a simple, durable and inexpensive attachment for tractors adapted to carry a tractor steering wheel in extended slanting position, whereby the tractor may be steered, in plowing, by running said wheel in a furrow and at the same time, maintaining the traction wheels of the tractor upon firm, unplowed ground.

Another object is to provide a device of this kind having means of adjustment to vary the inclination of the extended steering wheel to suit various conditions in plowing and also to vary the elevation of said wheel, whereby the tilting of the tractor is avoided in plowing furrows of various depths.

With the foregoing and other objects in view, which will appear in the following description, the invention resides in the novel combination and arrangement of parts and in the details of construction hereinafter described and claimed.

In the drawings, Fig. 1 is a plan view of an attachment embodying our invention; Fig. 2 is a front elevation thereof; Fig. 3 is an enlarged plan view of the knuckled extension member; Fig. 4 is a sectional view taken on the line 4—4 of Fig. 3, and Fig. 5 is a sectional view taken on the line 5—5 of Fig. 4.

Referring to the drawings, it will be noted that our improved attachment includes an adjustable knuckle extension member A adapted to be secured at its inner end to the usual knuckle 10 of a tractor axle 11. The improvement also includes an adjustable brace bar B to secure the knuckle extension member A in place and an extension tie-rod element C for elongating the reach of the usual tie-rod 12. The knuckle extension member A includes a rigid yoke-like reach $a$ and an auxiliary axle $b$ pivoted vertically with respect to the reach. Said reach $a$ comprises two spaced plates 13 joined at their inner ends to a spacer block 14. While we have shown the plates 13 and block 14 in separate parts, the same being rigidly connected by means of bolts 15 passing therethrough, it will be understood that said parts may be integral if desired. The block 14 fits closely within the knuckle 10 of the tractor axle 11 (Fig. 5) and is formed with a bore 16 therein to receive a bolt 17, which is passed through the pin receiving bosses 10$^a$ of the knuckle 10. The inner ends of the plates 13 extend inward sufficiently to snugly overlap the tractor axle on either side thereof and thereby brace the reach $a$ against lateral displacement. The auxiliary axle $b$ occupies the position between the plates 13 of the reach $a$, the outer end thereof projecting from the reach and being formed with a knuckle member 18 similar to the knuckle member 10 of the tractor axle. Said auxiliary axle $b$ is pivoted medially upon the plates 13 of the reach $a$ by means of a bolt 19 passing through a bore 20 in the auxiliary axle and through registering, vertically elongated bores 21 in the plates 13. Registering series of bores 22, near the outer ends of the plates 13, are formed to receive a bolt 23 passing through a bore 24 in the outer end of the auxiliary axle $b$. The centers of these bores lie in arcs struck from the centers of the bores 21. Opposed registering series of bores 25, near the inner ends of the plates 13, are formed to receive a bolt 26 passing through a bore 27 in the inner end of the auxiliary axle $b$. These series of bores 25 also lie in arcs struck from the centers of the bores 21. The bolt 19, in addition to aiding in securing the auxiliary axle $b$ with respect to the reach $a$, serves as a pivot for the auxiliary axle. The bolts 23 and 26 serve to lock the auxiliary axle in various tilted positions with respect to said reach. The bores 22 and 25 communicate to provide for close adjustment. The object in elongating the bores 21 in the plates 13 for the pivot bolt 19 is to permit a limited movement of said bolt therein to accord for slight inaccuracies in the location of the bores 22 and 25. The knuckle 18 on the auxiliary axle $b$ is designed to receive the spindle body 27$^a$ of the tractor steering wheel, also the original spindle bolt 28 ordinarily employed to pivot the tractor steering wheel upon the knuckle 10 of the tractor axle 11. Said knuckle 18 is tilted to dish the steering wheel 29 inwardly at the bottom so that it will hug the angle of a furrow. The bolt 23 is formed with an eye 30 to receive the forward end of the brace rod B, the rear end of said rod being anchored to the tractor frame 31 and equipped with a turn-buckle 32 for adjusting the reach thereof. The tie-rod extension C includes a clip 33 at one end for attachment to the spindle arm 34 of the steering wheel 29 and has, at its other end, a turn-buckle 35 threaded to fit the threaded end of the tractor tie-rod 12. This turn-buckle is adjusted to toe the steering wheel 29 inwardly so that said wheel will hug the land side of a furrow in travel.

It will be observed that the various objects above enumerated are carried out in the use of our improvement; that its application to a tractor is simple and, further, that the original tractor wheel may be employed as a part thereof.

Changes in the specific form of our invention, as herein disclosed, may be made within the scope of what is claimed without departing from the spirit of our invention.

Having described our invention, what we claim as new and desire to secure by Letters Patent is:

1. In a device of the class described, a knuckle extension member including a reach and an auxiliary axle pivoted thereon, said reach comprising a pair of plates, between which said auxiliary axle is positioned, and a block between said plates, said block being designed to fit within the knuckle bosses of a tractor axle and to receive a securing bolt passing through said bosses, means for bracing the extension member laterally, said auxiliary axle being supplied at its outer end with a knuckle designed to receive the spindle body of a tractor steering wheel and support said wheel in inwardly dished relation, means for securing the auxiliary axle in vertically adjusted positions within the reach and an adjustable tie-rod extension for connecting the extended steering wheel with the tractor tie-rod.

2. In a device of the class described, a knuckle extension member including a reach and an auxiliary axle pivoted thereon, said reach comprising a pair of plates, between which said auxiliary axle is positioned, and a block between said plates, said block being designed to fit within the knuckle bosses of a tractor axle and to receive a securing bolt passing through said bosses, the inner ends of said plates being designed to closely overlap the sides of the tractor axle on the inner side of said bolt to brace the extension member laterally, said auxiliary axle being supplied at its outer end with a knuckle to receive the steering wheel removed from the tractor axle, means for securing the auxiliary axle in vertically adjusted positions within the reach and a tie-rod extension for connecting the extended steering wheel with the tractor tie-rod.

3. In a device of the class described, a composite knuckle extension member adapted to be rigidly secured at its inner end to the knuckled end of a tractor axle, said member being designed to pivotally receive the spindle body of a tractor steering wheel, one section of said member being adjustable with respect to the other to elevate and depress said wheel and also to vary the inclination thereof, and means for bracing said extension member against lateral displacement.

4. In a device of the class described, a composite member adapted to be secured at its inner end to the knuckled end of a tractor axle, said member supplying a knuckle extension, continuing outwardly from the end of said axle, and designed to pivotally receive the spindle body of a tractor steering wheel, one section of said member being adjustable with respect to the other to elevate and depress said wheel.

5. In a device of the class described, a knuckle extension member comprising a yoke-like reach and an auxiliary axle, the reach being adapted to be rigidly secured at its inner end to the knuckled end of the tractor axle, in continuation of said axle, the auxiliary axle being adjustable vertically within the branches of the reach and adapted to receive the spindle body of a tractor wheel at the outer end thereof.

In testimony whereof, we have signed our names to this specification.

OSCAR MILTON HATCHER.
JAMES CHAPMAN CAMPBELL.